(12) United States Patent
Toresson et al.

(10) Patent No.: US 12,170,781 B2
(45) Date of Patent: Dec. 17, 2024

(54) SYSTEM AND METHOD FOR ADDING ONE ADDITIONAL IMAGE FRAME OR A SEQUENCE OF ADDITIONAL IMAGE FRAMES TO A STREAM OF ENCODED IMAGE FRAMES

(71) Applicant: Axis AB, Lund (SE)

(72) Inventors: Alexander Toresson, Lund (SE); Malte Johansson, Lund (SE)

(73) Assignee: AXIS AB, Lund (SE)

( * ) Notice: Subject to any disclaimer, the term of this patent is extended or adjusted under 35 U.S.C. 154(b) by 13 days.

(21) Appl. No.: 18/187,239

(22) Filed: Mar. 21, 2023

(65) Prior Publication Data
US 2023/0345011 A1 Oct. 26, 2023

(30) Foreign Application Priority Data
Apr. 25, 2022 (EP) ..................................... 22169707

(51) Int. Cl.
*H04N 19/137* (2014.01)
*G06V 10/56* (2022.01)
(Continued)

(52) U.S. Cl.
CPC ........... *H04N 19/159* (2014.11); *G06V 10/56* (2022.01); *G06V 10/60* (2022.01); *H04N 19/137* (2014.11); *H04N 19/186* (2014.11)

(58) Field of Classification Search
CPC .. H04N 19/159; H04N 19/137; H04N 19/186; G06V 10/56; G06V 10/60
(Continued)

(56) References Cited

U.S. PATENT DOCUMENTS

| 9,478,246 B2 | 10/2016 | Demerchant et al. |
| 10,000,154 B2 | 6/2018 | Schondorf et al. |

(Continued)

FOREIGN PATENT DOCUMENTS

| KR | 20200057346 A | 5/2020 |
| WO | 2006/006081 A2 | 1/2006 |

OTHER PUBLICATIONS

Extended European Search Report dated Oct. 20, 2022 for European Patent Application No. 22169707.1.
(Continued)

*Primary Examiner* — Albert Kir
(74) *Attorney, Agent, or Firm* — Volpe Koenig

(57) ABSTRACT

A method for adding at least one additional image frame to a stream of encoded image frames, the stream of encoded image frames comprising image frames encoded by an encoder. An event relating to at least one of: i) a change of operation state of a sender of the stream of encoded image frames, or ii) a change of connection state between the sender and a receiver is detected. Depending on the type of the detected event, the at least one additional image frame is provided. Each at least one additional image frame comprises a reference to a preceding image frame and codes a predetermined visual change relative to the preceding image frame. The predetermined visual change is indicative of the type of the detected event. The at least one additional image frame is added to the stream of encoded image frames to obtain a combined stream of image frames.

11 Claims, 2 Drawing Sheets

(51) Int. Cl.
  *G06V 10/60*   (2022.01)
  *H04N 19/159*  (2014.01)
  *H04N 19/186*  (2014.01)
  *H04N 19/56*   (2014.01)
  *H04N 19/60*   (2014.01)

(58) Field of Classification Search
  USPC .................................................. 375/240.13
  See application file for complete search history.

(56) References Cited

U.S. PATENT DOCUMENTS

| | | | |
|---|---|---|---|
| 10,356,437 B2 * | 7/2019 | Hashimoto | H04N 19/167 |
| 10,869,032 B1 * | 12/2020 | Shen | H04N 21/234327 |
| 11,025,969 B1 * | 6/2021 | Hegar | H04N 21/8453 |
| 2003/0122667 A1 | 7/2003 | Flynn | |
| 2007/0009035 A1 | 1/2007 | Craig et al. | |
| 2019/0075297 A1 | 3/2019 | Meier et al. | |
| 2023/0055497 A1 * | 2/2023 | Sim | H04N 19/105 |

OTHER PUBLICATIONS

Korean Office Action issued on Sep. 19, 2024 for Korean Patent Application No. 22169707.1.
Le Callet, P., et al., "Qualinet White Paper on Definition of Quality of Experience", Article, (2013).
Schwarz, H., et al., "Overview of the Scalable Video Coding Extension of the H.264/AVC Standard", Journal, IEEE Transactions on Circuits and Systems for Video Technology, (2007).

* cited by examiner

SYSTEM AND METHOD FOR ADDING ONE ADDITIONAL IMAGE FRAME OR A SEQUENCE OF ADDITIONAL IMAGE FRAMES TO A STREAM OF ENCODED IMAGE FRAMES

FIELD OF INVENTION

The present invention relates to adding one additional image frame or a sequence of additional image frames to a stream of encoded images, and specifically wherein the one additional image frame or the sequence of additional image frames code a predetermined visual effect.

TECHNICAL BACKGROUND

In scenarios where a stream of encoded image frames of a video captured by a camera is received, decoded and displayed in a display, e.g., at a remote location, and the camera is deliberately shut down, the camera is shut down due to failure, or a connection between the camera and the display location fails, the stream will be interrupted and no further image frames will be received at the display location. The displaying of the video will then be interrupted, e.g., by no image frame at all being displayed or by the last received image frame being continuously displayed. Hence, a person viewing the video may realize that the stream has been interrupted but will not know the reason why. Similarly, when a restart of the camera or a restoration of the connection between the camera and the display location is initiated and before a new stream of encoded image frames is generated and received at the display location for decoding and displaying, a person viewing the display will not know that the video is about to be displayed.

SUMMARY

One object of the present invention is to enable identification in a decoded and displayed stream of encoded image frames of a type of a detected event, wherein the type of event is one of a change of operation state of a sender of the stream of encoded image frames and a change of connection state between the sender and a receiver of the stream of encoded image frames.

According to a first aspect, a method for adding one additional image frame or a sequence of additional image frames to a stream of encoded image frames, wherein the stream of encoded image frames consists of image frames encoded by an encoder, is provided. The method comprises detecting an event relating to at least one type out of a change of operation state of a sender of the stream of encoded image frames, and a change of connection state between the sender and a receiver of the stream of encoded image frames. Depending on the type of the detected event, the one additional image frame or the sequence of additional image frames is provided, wherein the one additional image frame or each additional image frame of the sequence of additional image frames comprises a reference to a preceding image frame and codes a predetermined visual change relative to the preceding image frame. The predetermined visual change is indicative of the type of the detected event. The one additional image frame or the sequence of additional image frames is added to the stream of encoded image frames to obtain a combined stream of image frames.

Since the one additional image frame or the sequence of additional image frames codes the predetermined visual change relative the preceding image frame and the predetermined visual change is indicative of the type of the detected event, the combined stream of image frames will include information enabling identification of a type of a detected event when the combined stream is decoded and displayed. Specifically, identification whether the type of event is a change of operation state of a sender of the stream of encoded image frames or a change of connection state between the sender and a receiver of the stream of encoded image frames is enabled.

Since the predetermined visual change is coded by means of the one additional image frame or the sequence of additional image frames, the information enabling identification of the type of the detected event can be transmitted within the combined stream and be decoded and displayed by means of a decoder and display arranged for decoding and displaying the stream of encoded image frames without adaptation of the decoder and the display.

Since the visual change is predetermined and in relation to a preceding image frame, it is possible to generate the one additional image frame or the sequence of additional image frames in advance, i.e., before detecting of the event, and store them for provision and adding after detecting the event. The one additional image frame or the sequence of additional image frames need only include data coding this visual change and not any real time data in relation to the stream of encoded image frames.

The method of the first aspect may further comprise generating the one additional image frame or each additional image frame of the sequence of additional image frames based only on block types (e.g., whether a block is an interblock such as P- or B-block, intrablock or skipblock), and predetermined motion vectors and/or predetermined frequency domain coefficients. It is thus possible to generate the one additional image frame or the sequence of additional image frames using software only. Furthermore, it is possible to generate the one additional image frame or the sequence of additional image frames in advance, i.e., before detecting of the event, and store them for provision and adding to the stream of encoded image frames after detecting the event.

In the method of the first aspect, the one additional image frame or the sequence of additional image frames may each further comprise at least one of one or more interblocks with predetermined motion vectors and/or predetermined quantized frequency domain coefficients, and one or more intrablocks with predetermined quantized frequency domain coefficients. The one additional image frame or the sequence of additional image frames may each further comprise one or more skip blocks.

By the expressions "predetermined motion vectors" and "predetermined quantized frequency domain coefficients" when used herein are meant motion vectors and quantized frequency domain coefficients that are predetermined and code the predetermined visual change either alone or in combination. The quantized frequency domain coefficients may for example be quantized Discrete Cosine Transform (DCT) coefficients, or other alternatives depending on encoding standard. In AV1 such alternatives may be quantized asymmetric discrete sine transform DST) coefficients, quantized flipped ADST (FLIPADST) coefficients, quantized identity transform coefficients, and quantized Walsh-Hadamard transform (WHT) coefficients. The latter may also be used in VP8.

In the method of the first aspect, the preceding image frame may be one out of an encoded image frame in the stream of encoded image frames, an added start image frame intracoding a start image, and an additional image frame in the sequence of additional image frames. The preceding image frame may further be a directly preceding image frame in the combined stream of image frames. In alternative it may be an image frame preceding the directly preceding image frame.

In the method of the first aspect, the sequence of additional image frames comprises at least one out of additional image frames having different references and the same content, additional image frames having the same reference and different content, and additional image frames having different reference and different content.

The method of the first aspect may further comprise transmitting the combined stream of image frames to a decoder, decoding the combined stream of image frames, and displaying the decoded combined stream of image frames on a display thereby displaying the predetermined visual changes indicative of the detected event.

In the method of the first aspect, the detected event may relate to at least one type out of a shutdown of the sender of the stream of encoded image frames, a connection failure between the sender and the receiver of the stream of encoded image frames, a failure of the sender of the stream of encoded image frames, a start-up of the sender of the stream of encoded image frames, a reconnection between the sender and the receiver of the stream of encoded image frames, and a reboot of the sender of the stream of encoded image frames. Additionally, the shutdown of the sender may be divided into two separate types of events depending on whether the shutdown is initiated at the receiver or at the sender.

In the method of the first aspect, the predetermined visual change may be one out of a movement, a change in colour, and a change in brightness.

According to a second aspect, a non-transitory computer-readable storage medium is provided having stored thereon instructions for implementing the method according to the first aspect when executed in a system having at least one processor.

The above-mentioned optional features of the method according to the first aspect, when applicable, apply to the non-transitory computer-readable storage medium of the second aspect as well. In order to avoid undue repetition, reference is made to the above.

According to a third aspect, a system for adding one additional image frame or a sequence of additional image frames to a stream of encoded image frames is provided, wherein the stream of encoded image frames consists of image frames encoded by an encoder. The system comprises circuitry configured to execute a detecting function configured to detect an event relating to at least one type out of a change of operation state of a sender of the stream of encoded image frames, and a change of connection state between the sender and a receiver of the stream of encoded image frames. The circuitry is further configured to execute a providing function configured to, depending on the type of the event detected by the detecting function, provide the one additional image frame or the sequence of additional image frames, wherein the one additional image frame or each additional image frame of the sequence of additional image frames comprises a reference to a preceding image frame and codes a predetermined visual change relative to the preceding image frame, wherein the predetermined visual change is indicative of the type of the detected event. The circuitry is further configured to execute an adding function configured to add the one additional image frame or the sequence of additional image frames to the stream of encoded image frames to obtain a combined stream of image frames.

The above-mentioned optional features of the method according to the first aspect, when applicable, apply to the system of the third aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that this disclosure is not limited to the particular component parts of the system described or acts of the methods described as such system and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present disclosure will now be set forth in more detail, with reference to appended figures. The figures should not be considered limiting but are instead used for explaining and understanding.

DETAILED DESCRIPTION

Figure 1:
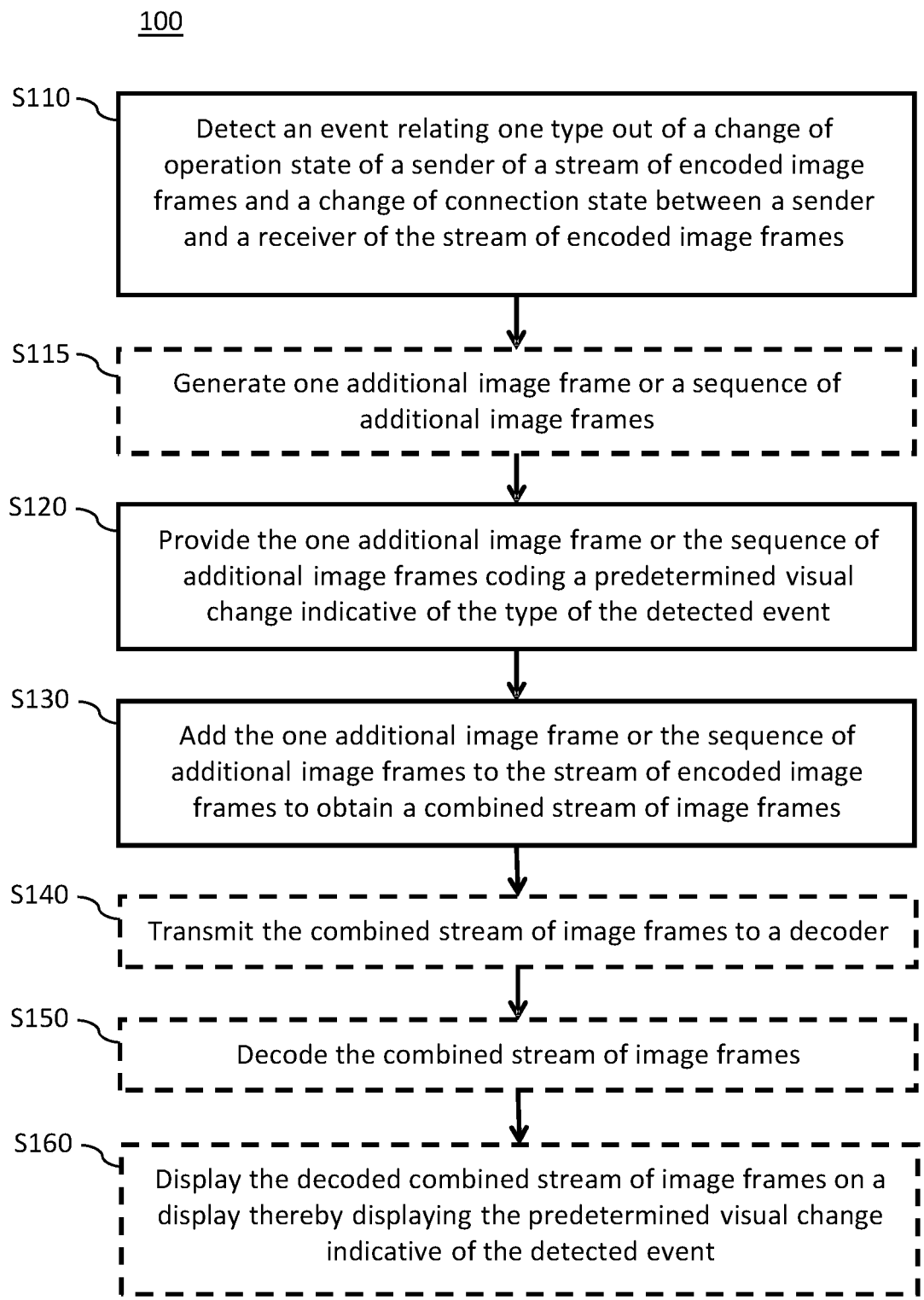
FIG. 1 shows a flow chart in relation to embodiments of a method of the present disclosure.

The present invention will now be described hereinafter with reference to the accompanying drawings, in which currently preferred embodiments are illustrated. There may, however, be many different embodiments and should not be construed as limited to the embodiments set forth herein. In the drawings, boxes with dashed lines denote optional feature.

Figure 3:
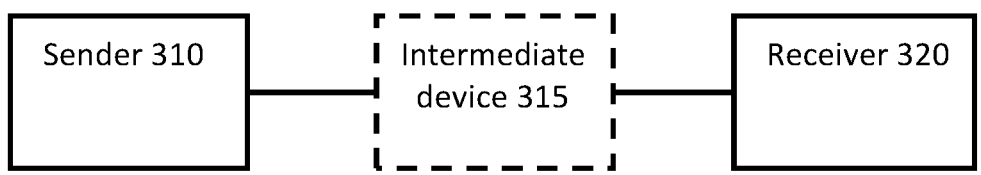
FIG. 3 shows a schematic diagram of a system in which embodiments of the present disclosure may be implemented.

A system 300 as illustrated in FIG. 3 processes a stream of encoded image frames is to be transmitted from a sender 310 to a receiver 320. The sender 310 may for example be a camera, such as a surveillance camera, or a system comprising the camera at a camera location. The receiver 320 may be a device comprising a decoder and connected to a display at a display location. A further intermediate device 315 may be located between the sender 310 and the receiver 320. Each of the sender 310, the intermediate device 315, and the receiver 320 may detect events relating to at least one type out of a change of operation state of the sender 310, and a change of connection state between the sender 310 and the receiver 320.

The teachings herein are applicable in a scenario when a stream of encoded image frames is transmitted from the sender 310 to the receiver 320 for decoding and displaying. The stream of encoded image frames may for example consist of images captured by a camera and encoded by an encoder. In an alternative, some or all of the stream of encoded frames may be images created in software. The stream of encoded frames may be a video and the camera may be a camera arranged in a remote location from a display location where a person is viewing the video. If the transmission of the stream of encoded image frames is interrupted so that the receiver 320 does not receive any further encoded image frames, the video will be interrupted and a person viewing the video will not know the reason to why the video is interrupted. By adding one additional image frame or a sequence of additional image frames coding a predetermined visual change relative a preceding image frame a combined stream is created. The predetermined visual change is made indicative of the type of the detected event to the stream of encoded image frames. For example, at least two different predetermined visual changes may be selectable and each one is indicative of a respective one of two types of events, namely: i) a change of operation state of the sender 310 of the stream of encoded image frames and ii) a change of connection state between the sender 310 and the receiver 320 of the stream of encoded image frames. When the combined stream is then decoded and displayed, the viewer can, from the predetermined visual change, identify which type of event has occurred. Specifically, the viewer can identify whether the type of event is a change of operation state of the sender 310 of the stream of encoded image frames or a change of connection state between the sender 310 and the receiver 320 of the stream of encoded image frames.

By including the information enabling identification of the type of the detected event in the form of the one additional image frame or the sequence of additional frame coding the predetermined visual change which is added to the stream of encoded image frames and transmitted within the combined stream, no adaptation of the interface between the sender 310 and the receiver 320 are required. Furthermore, the decoder and the display at the receiver 320 need not be adapted. They can decode and display the combined stream in the same way as decoding and displaying the stream of encoded image frames. The only thing required is that a viewer is aware of which predetermined visual change is indicative of which type of event. Furthermore, since the visual change is predetermined and in relation to a preceding image frame, it is possible to generate the one additional image frame or the sequence of additional image frames in advance, i.e., before detecting of the event, and store them for provision and adding after detecting the event. The one additional image frame or the sequence of additional image frames need only include data coding this visual change, and not any real time data in relation to the stream of encoded image frames.

It is to be noted that even if there is no reference to encoding in the terms "one additional image frame" and "sequence of additional image frames", both of the terms relate to one or more image frames that are generated in such a way and have a syntax according to the relevant coding standard used such that they can be decoded by the decoder decoding the stream of encoded image frames without adaptation. For example, before the one additional image frame or the sequence of additional image frames are added to the stream of encoded image frames to obtain a combined stream of image frames, entropy encoding has to be performed using an entropy encoder configured in hardware and/or software.

In the following, embodiments of a method 100 for adding one additional image frame or a sequence of additional image frames to a stream of encoded image frames, wherein the stream of encoded image frames consists of image frames encoded by an encoder, will be discussed with reference to FIG. 1 and FIG. 3.

Typically, some of the image frames of the stream of encoded image frames are intraframes and some are interframes. An intraframe is an encoded video frame that does not require information from other frames to be decoded. Hence, an intraframe is encoded based on information from an image frame of video data it is set to correspond to. Typically, similarities within the image frame are used to encode the image frame into an intraframe. In video encoding, an intraframe is often referred to as an I-frame. The image frames of the video stream in between two intraframes are encoded as interframes. An interframe is encoded based on information from at least one other image frame to be encoded than the image frame of video data the interframe is set to correspond to. Interframes typically comprise less data than intra frames. An interframe may be a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame. When encoding an interframe, an image frame is divided into multiple groups of pixels. The groups of pixels may for example be referred to as blocks, macroblocks, or coding tree units. Each interframe may comprise one or more blocks encoded as interblocks, one or more blocks encoded as intrablocks, and one or more blocks encoded as skipblocks. The image frame is compared to a reference frame. For example, the reference frame for encoding a P-frame is a previous image frame. For encoding of a sequence of image frames in an encoder, a matching algorithm may be used to identify matching groups of pixels between the image frame to be encoded and the reference frame and if a match is found for a group of pixels, that group of pixels may be encoded based on a motion vector specifying how the group of pixels has moved in the image frame since the reference frame.

The method 100 comprises detecting S110 an event relating to at least one type out of: i) a change of operation state of a sender 310 of the stream of encoded image frames, and ii) a change of connection state between the sender 310 and a receiver 320 of the stream of encoded image frames. The sender 310 may for example be a camera or a system comprising the camera which transmits the stream of encoded image frames. A change of operation state of the sender 310 may be the sender 310 changing to an operation state in which the stream of encoded image frames is not transmitted or where the stream of encoded image frames is transmitted. A change of operation state may for example relate to a deliberate shutdown of the sender 310, a failure of the sender 310, and a reboot of the sender 310. Additionally, the deliberate shutdown of the sender may be divided into two separate types of events depending on whether the shutdown is initiated at the receiver or at the sender. A change of connection state between the sender 310 and the receiver 320 may be to a connection state in which the stream of encoded image frames cannot be transmitted or where the stream of encoded image frames can be transmitted between the sender 310 and the receiver 320. A change of connection state may for example relate to a connection failure between the sender 310 and the receiver 320, and a reconnection between the sender 310 and the receiver 320.

Depending on the type of the detected event, the one additional image frame or the sequence of additional image frames is provided S120. The one additional image frame or each additional image frame of the sequence of additional image frames comprises a reference to a preceding image frame and codes the predetermined visual change relative to the preceding image frame, wherein the predetermined visual change is indicative of the type of the detected event. By the one additional image frame or each additional image frame of the sequence of additional image frames comprising a reference to the preceding image frame is meant that the preceding frame is used as a reference frame.

The event may be detected by the sender 310 or the receiver 320 or the intermediate device 315. If the type of event is a change of operation state of the sender, such as a deliberate shutdown of the sender 310, a reboot of the sender 310, or a failure of the sender 310, the event may be detected by the sender 310. If the type of event is a change of connection state between the sender 310 and the receiver 320, such as a connection failure between the sender 310 and the receiver 320, and a reconnection between the sender 310 and the receiver 320, the event may be detected by the receiver 320 or the intermediate device 315.

The predetermined visual change may be any kind of visual change that can be encoded, and which can be identified by a viewer and distinguished from other predetermined visual changes encoded to be indicative of events of other types. For example, the predetermined visual change may be a movement, a change in colour, or a change in brightness.

For example, if the predetermined visual change relates to a predetermined movement of pixels, e.g., predetermined movement of blocks of pixels, in relation to the preceding frame, such movement can be achieved by respective predetermined motion vectors for the blocks. The motion vectors are predetermined since the movement is predetermined. As the movement of pixels is predetermined in order to enable it to be indicative of a type of the detected event, it is possible determine the motion vectors without any further input than the predetermined movement of pixels in relation to the preceding frame that should be achieved according to the predetermined visual change. This differs from identification of motion vectors when encoding of a sequence of image frames in an encoder, where a matching algorithm is used to identify matching block between the image frame to be encoded and the reference frame and if a match is found for a block, that block may be encoded based on a motion vector specifying how the block has moved in the image frame since the reference frame.

Similarly, if the predetermined visual change relates to a predetermined change of colour or brightness of pixels, e.g., predetermined change of colour or brightness of blocks of pixels, in relation to the preceding frame, such change of colour or brightness can be achieved by respective predetermined frequency domain coefficients for the blocks. The frequency domain coefficients are predetermined since the change of colour or brightness is predetermined. As the change of colour or brightness of pixels is predetermined in order to enable it to be indicative of a type of the detected event, it is possible determine the frequency domain coefficients without any further input than the predetermined change of colour or brightness of pixels in relation to the preceding frame that should be achieved according to the predetermined visual change.

The one additional image frame or the sequence of additional image frames may be generated S115 after detecting S110 of the event or have been generated S115 already before detecting S110 the event and stored for provision after detecting S110 the event. It is to be noted that the location of generating S115 the one additional image frame or the sequence of additional image frames after the detecting S110 an event in FIG. 1 does not indicate its location in the method 100. Generating S115 the one additional image frame or the sequence of additional image frames can be performed either before or after the detecting S110 an event. Furthermore, it may be performed to some extent before and to some extent after detecting S110 an event. For example, the one additional image frame or the sequence of additional image frames may be generated up until before entropy encoding and stored before the detecting S110 an event, and then the entropy encoding may be performed after detecting S110 the event.

The one additional image frame or each additional image frame of the sequence of additional image frames comprises a reference to a preceding image frame in relation to which the predetermined visual change is encoded. To encode the predetermined visual change, the one additional image frame or each additional image frame of the sequence of additional image frames are generated to include data defining predetermined changes in relation to the preceding image frame.

In embodiments, the one additional image frame or each additional image frame of the sequence of additional image frames may be generated S115 based only on predetermined motion vectors and/or predetermined quantized frequency domain coefficients. The one additional image frame or each additional image frame of the sequence of additional image frames may be an interframe and comprises one or more interblocks with motion vectors and/or quantized frequency domain coefficients, and/or one or more intrablocks with quantized frequency domain coefficients. The one or more interblocks and/or one or more intrablocks encode the predetermined visual change in relation to the reference image frame, such as predetermined movement, a predetermined change in colour, and/or a predetermined change in brightness in relation to the reference image. The one additional image frame or each additional image frame of the sequence of additional image frames may further comprise one or more skip blocks.

Generating S115 the one additional image frame or the sequence of additional image frames based only on block types (e.g., whether a block is an interblock such as P- or B-block, intrablock or skipblock), and predetermined motion vectors and/or predetermined quantized frequency domain coefficients may be performed completely in software up until before entropy encoding and then the entropy encoding may be performed by a software or hardware entropy encoder. Such generation performed completely in software may be referred to as procedural generation. No image data is required for the generating S115. For coding standards where a slice header and slice data can be encoded separately, the slice data may be entropy encoded and stored and the slice header needs be updated just before adding. This is for example the case for CABAC in H.264 main, and high, and in H.265. For coding standards where a slice header and slice data cannot be encoded separately, e.g., because entropy encoding the slice data requires some bits of the slice header as input and hence all of the slice header needs to have been updated, the slice header needs to be updated and the slice data then needs to be entropy encoded just before adding. This is for example the case for CAVLC in H.264.

The one additional image frame or the sequence of additional image frames is added S130 to the stream of encoded image frames to obtain a combined stream of image frames.

Scenarios where one additional image frame is provided and added are for example when the last image frame provided to the display is continuously displayed until a next image frame is provided to the display. In such a case, one additional image frame is sufficient to encode a predetermined visual change relative the preceding image frame, which predetermined visual change can be identified by a viewer.

In scenarios where a predetermined visual change that is predetermined and gradually changing over time is to be coded, a sequence of additional frames is required to code it. For example, a plurality of the same type of additional frame may be included in the sequence, wherein each additional frame has the same predetermined motion vectors and/or predetermined quantized frequency domain coefficients but they refer to the frame directly preceding it in the stream. Thus, these additional frames have the same content but different references, and therefore they code the same visual change relative a preceding frame. When such a sequence of additional frames is added after a stream of encoded frames and then decoded and displayed, they will display the last decoded encoded frame as gradually changing. For example, if ten additional frames each codes a rotation of five degrees to a preceding frame, they will when added after a stream of encoded frames cause the image of last decoded encoded frame to rotate in step of five degrees from zero to 50 degrees.

The one additional image frame or the sequence of additional frames may be added by the sender 310, the receiver 320 or the intermediate device 315. If the type of event is a change of operation state of the sender, such as a deliberate shutdown of the sender 310, a reboot of the sender 310, or a failure of the sender 310, the one additional image frame or the sequence of additional frames may be added by the sender 310 or the receiver 320 or the intermediate device 315. If the type of event is a change of connection state between the sender 310 and the receiver 320, such as a connection failure between the sender 310 and the receiver 320, and a reconnection between the sender 310 and the receiver 320, one additional image frame or the sequence of additional frames may be added by the sender 310, the receiver 320 or the intermediate device 315.

The one additional image frame or the sequence of additional image frames may for example be added after the stream of encoded image frames or before the stream of encoded image frames. The one additional image frame or the sequence of additional image frames is preferably added in a location and order in the stream in which they should be decoded in relation to the other image frames of the stream of encoded image frames in a decoder at the receiver 320. The one additional image frame or each additional image frame of the sequence of additional frames includes a frame number and a picture order count in order to identify when it should be displayed in relation to the other image frames of the combined stream of image frames. If the one additional image frame or the sequence of additional image frames code a visual change indicative of a change of operation state to an operation state in which the stream of encoded image frames is not transmitted or a change of connection state between the sender 310 and the receiver 320 to a connection state in which the stream of encoded image frames cannot be transmitted, the predetermined visual change should be displayed at the end of the stream of encoded image frames and hence, the one additional image frame or the sequence of additional image frames is preferably added after the last encoded image frame of the stream of encoded image frames. Such a change of operation state may for example relate to a deliberate shutdown of the sender 310, a failure of the sender 310, and a connection failure between the sender 310 and the receiver 320. If the one additional image frame or the sequence of additional image frames code a visual change indicative of a change of operation state to an operation state in which the stream of encoded image frames is transmitted or a change of connection state between the sender 310 and the receiver 320 to a connection state in which the stream of encoded image frames can be transmitted, the predetermined visual change should be displayed at the beginning of the stream of encoded image frames and hence, the one additional image frame or the sequence of additional image frames is added before the first encoded image frame of the stream of encoded image frames. Such a change of operation state may for example relate to a reboot of the sender 310, and a reconnection between the sender 310 and the receiver 320. As will be described below, when the one additional image frame or the sequence of additional image frames are added before the first encoded image frame, a preceding image frame being a start image frame needs to be added. In such a case, the first encoded image frame of the stream of encoded image frames needs to be an intraframe.

The preceding image frame may be an encoded image frame in the stream of encoded image frames. For example, if the one additional image frame or the sequence of additional image frames should be added after a last encoded image frame of the stream of encoded image frames, such as when the detected event is a deliberate shutdown of the sender 310, a failure of the sender 310, or a connection failure between the sender 310 and the receiver 320, the one additional image frame or at least one image frame of the sequence of additional image frames comprises a reference to an encoded image frame in the stream of encoded image frames. For example, the one additional image frame may comprise a reference to an encoded image frame in the stream of encoded image frames, such as the last encoded image frame of the stream of encoded image frames. Similarly, for example the first image frame of the sequence of additional image frames may comprise a reference to an encoded image frame in the stream of encoded image frames, such as the last encoded image frame of the stream of encoded image frames. The further image frames after the first image frame of the sequence of additional image frames may then comprise a reference to a preceding image frame in the sequence of additional image frames, such as the directly preceding image frame in the sequence of additional image frames. In such a case, the preceding image frame is an additional image frame in the sequence of additional image frames. In alternative, all of the image frames of the sequence of additional image frames may comprise a reference to an encoded image frame in the stream of encoded image frames, such as the last encoded image frame of the stream of encoded image frames.

In alternative, the preceding image frame may be an added start image frame intracoding a start image. For example, if the one additional image frame or the sequence of additional image frames should be added before a first encoded image frame of the stream of encoded image frames, such as when the detected event is a reboot of the sender 310, or a reconnection between the sender 310 and the receiver 320, the one additional image frame or at least one image frame of the sequence of additional image frames comprises a reference to the added start image frame. The further image frames after the first image frame of the sequence of additional image frames may then comprise a reference to a preceding image frame in the sequence of additional image frames, such as the directly preceding image frame in the sequence of additional image frames. In such a case the preceding image frame is an additional image frame in the sequence of additional image frames. In alternative, all of the image frames of the sequence of additional image frames may comprise a reference to the added start image frame.

The image frames of the sequence of additional image frames may have different references and picture order count, but the same content. For example, as described hereinabove, the first image frame of the sequence of additional image frames may comprise a reference to the last encoded image frame of the stream of encoded image frames or the added start image, and the further image frames after the first image frame of the sequence of additional image frames may then comprise a reference to a preceding image frame in the sequence of additional image frames, such as the directly preceding image frame in the sequence of additional image frames, i.e., in the combined stream of image frames. The image frames of the sequence of additional image frames having the same content may then mean that the predetermined same visual change in relation to the preceding image frame is encoded in each additional image frame of the sequence of additional image frames. For example, the predetermined visual change in each consecutive additional image frame of the sequence of additional image frames may relate to a predetermined same movement such that the sequence of additional image frames encodes a predetermined uniform movement of pixels. The predetermined visual change in each consecutive additional image frame of the sequence of additional image frames may alternatively or additionally relate to a predetermined same change in colour such that the sequence of additional image frames encodes a predetermined uniform change in colour of pixels. The predetermined visual change in each consecutive additional image frame of the sequence of additional image frames may alternatively or additionally relate to a predetermined same change in brightness such that the sequence of additional image frames encodes a predetermined uniform change in brightness.

The image frames of the sequence of additional image frames may have different references and different content. For example, as described hereinabove, the first image frame of the sequence of additional image frames may comprise a reference to the last encoded image frame of the stream of encoded image frames or the added start image, and the further image frames after the first image frame of the sequence of additional image frames may then comprise a reference to a preceding image frame in the sequence of additional image frames, such as the directly preceding image frame in the sequence of additional image frames. The image frames of the sequence of additional image frames having different content may then mean that a predetermined different visual change in relation to the preceding image frame is encoded in each additional image frame of the sequence of additional image frames. For example, the predetermined visual change in each consecutive additional image frame of the sequence of additional image frames may relate to a predetermined increased or decreased movement such that the sequence of additional image frames encodes a predetermined accelerating or decelerating movement of pixels, respectively. The predetermined visual change in each consecutive additional image frame of the sequence of additional image frames may alternatively or additionally relate to a predetermined increased or decreased change in colour such that the sequence of additional image frames encodes a predetermined accelerating or decelerating change in colour of pixels, respectively. The predetermined visual change in each consecutive additional image frame of the sequence of additional image frames may alternatively or additionally relate to a predetermined increased or decreased change in brightness such that the sequence of additional image frames encodes a predetermined accelerating or decelerating change in brightness of pixels, respectively.

The image frames of the sequence of additional image frames may have the same reference and different content. For example, as described hereinabove, all of the image frames of the sequence of additional image frames may comprise a reference to an encoded image frame in the stream of encoded image frames, such as the last encoded image frame of the stream of encoded image frames or the added start image. The image frames of the sequence of additional image frames having different content may then mean that a different predetermined visual change in relation to the same preceding image frame, such as the last encoded image frame of the stream of encoded image frames or the added start image, is encoded in each additional image frames of the sequence of additional image frames. For example, the predetermined visual change in each consecutive additional image frame of the sequence of additional image frames may relate to a predetermined uniformly larger movement such that the sequence of additional image frames encodes a predetermined uniform movement of pixels. The predetermined visual change in each consecutive additional image frame of the sequence of additional image frames may alternatively or additionally relate to a predetermined uniformly larger change in colour such that the sequence of additional image frames encodes a predetermined uniform change in colour of pixels. The predetermined visual change in each consecutive additional image frame of the sequence of additional image frames may alternatively or additionally relate to a predetermined uniformly larger change in brightness such that the sequence of additional image frames encodes a predetermined uniform change in brightness of pixels. The change of movement, colour, and/or brightness may also be made such that it is accelerated, i.e., such that the change becomes increasingly larger between consecutive additional image frame of the sequence of additional image frames or decelerated, i.e., such that the change becomes increasingly smaller between consecutive additional image frame of the sequence of additional image frames.

As an example, having the same or different content means having the same or different, respectively, slice data in the H.264 and H.265 video standards.

A multitude of different predetermined visual changes are envisaged using one or a combination of for example movement, change in colour, and change in brightness. For example, if the sequence of additional image frames encode a visual change in relation to an encoded image frame of the stream of encoded image frames, wherein the encoded visual change is a movement of all pixels a given distance towards a centre in each consecutive additional image frame of the sequence of additional image frames, either only in the horizontal or only in the vertical direction or in both directions, a visual change is achieved where the encoded image frame of the stream of encoded image frames gradually shrinks to a horizontal line, vertical line or a point, respectively. As this will move the edge pixels towards a centre in each consecutive additional image frame of the sequence of additional image frames, these edge pixels need to be changed to or faded to a single colour in order for the final result being a single colour screen except from pixels in the centre which may maintain some other colour. This predetermined visual change may be encoded in a sequence of additional image frames comprising predetermined motion vectors and predetermined quantized frequency domain coefficients.

In another example, if the sequence of additional image frames encode a visual change in relation to an encoded image frame of the stream of encoded image frames, wherein the encoded visual change is a movement of pixel blocks by a given angle around a centre in each consecutive additional image frame of the sequence of additional image frames, a visual change is achieved where the encoded image frame of the stream of encoded image frames is rotated around its centre. This predetermined visual change may be encoded in a sequence of additional image frames comprising predetermined motion vectors and works for small rotational angles in each consecutive additional image frame. A reason to why it only works for 'small' rotational angles is that the movement is made by moving pixel blocks and hence for any pixel block larger than one pixel this is only an approximation of rotational movement. Larger movements which approximate rotational movement in each consecutive additional image frame of the sequence of additional image frames will be possible but will introduce artifacts in relation to rotational movement. The size of the angular movement in each consecutive additional image frame of the sequence of additional image frames depends on the size of the pixel blocks. For example, for pixel blocks of size 8×8 pixels, a movement in each consecutive additional image frame of the sequence of additional image frames corresponding to 7 degrees will at least be small enough. Also, movement in each consecutive additional image frame of the sequence of additional image frames corresponding to larger angles is possible but will introduce further artifacts. A movement corresponding to a desired total rotational movement can be achieved by providing a sequence of additional image frames with sufficient number of additional image frames such that movement in each consecutive additional image frame of the sequence of additional image frames corresponding to the 'small' angle will produce the desired total angle over all of the sequence of additional image frames. A desired angle of any size may then be achieved.

In another example, if the sequence of additional image frames encode a visual change in relation to an encoded image frame of the stream of encoded image frames, wherein the encoded visual change is a decrease or an increase of brightness of all pixels by a given amount in each consecutive additional image frame of the sequence of additional image frames, a visual change is achieved where the encoded image frame of the stream of encoded image frames gradually becomes black or white, respectively. This predetermined visual change may be encoded in a sequence of additional image frames comprising predetermined quantized frequency domain coefficients.

In another example, if the sequence of additional image frames encode a visual change in relation to an encoded image frame of the stream of encoded image frames, wherein the encoded visual change is a decrease or an increase of brightness of selected pixels by a given amount in each consecutive additional image frame of the sequence of additional image frames, a visual change is achieved where the selected pixels of the encoded image frame of the stream of encoded image frames gradually becomes black or white, respectively. The selected pixels may for example be pixels selected to form a desired text message in the image frame. This predetermined visual change may be encoded using predetermined frequency domain coefficients.

In another example, if the sequence of additional image frames encode a visual change in relation to an encoded image frame of the stream of encoded image frames, wherein the encoded visual change is an increase of a specific colour for all pixels by a given amount and decrease of all other colours for all pixels by a respective given amount in each consecutive additional image frame of the sequence of additional image frames, a visual change is achieved where the encoded image frame of the stream of encoded image frames gradually turns into the specific colour. This predetermined visual change may be encoded in a sequence of additional image frames comprising predetermined quantized frequency domain coefficients.

In another example, if the sequence of additional image frames encode a visual change in relation to an encoded image frame of the stream of encoded image frames, wherein the encoded visual change is an increase of a specific colour of selected pixels by a given amount in each consecutive additional image frame of the sequence of additional image frames, a visual change is achieved where the selected pixels of the encoded image frame of the stream of encoded image frames gradually turn into the specific colour. The selected pixels may for example be pixels selected to form a desired text message in the image frame. This predetermined visual change may be encoded in a sequence of additional image frames comprising predetermined quantized frequency domain coefficients.

The method 100 may further comprise transmitting S140 the combined stream of image frames to a decoder, e.g., comprised in the receiver 320, decoding S150 the combined stream of image frames, and displaying S160 the decoded combined stream of image frames on a display, e.g., connected to the receiver 320. When displaying the combined stream, the predetermined visual changes indicative of the detected event will be displayed.

Figure 2:
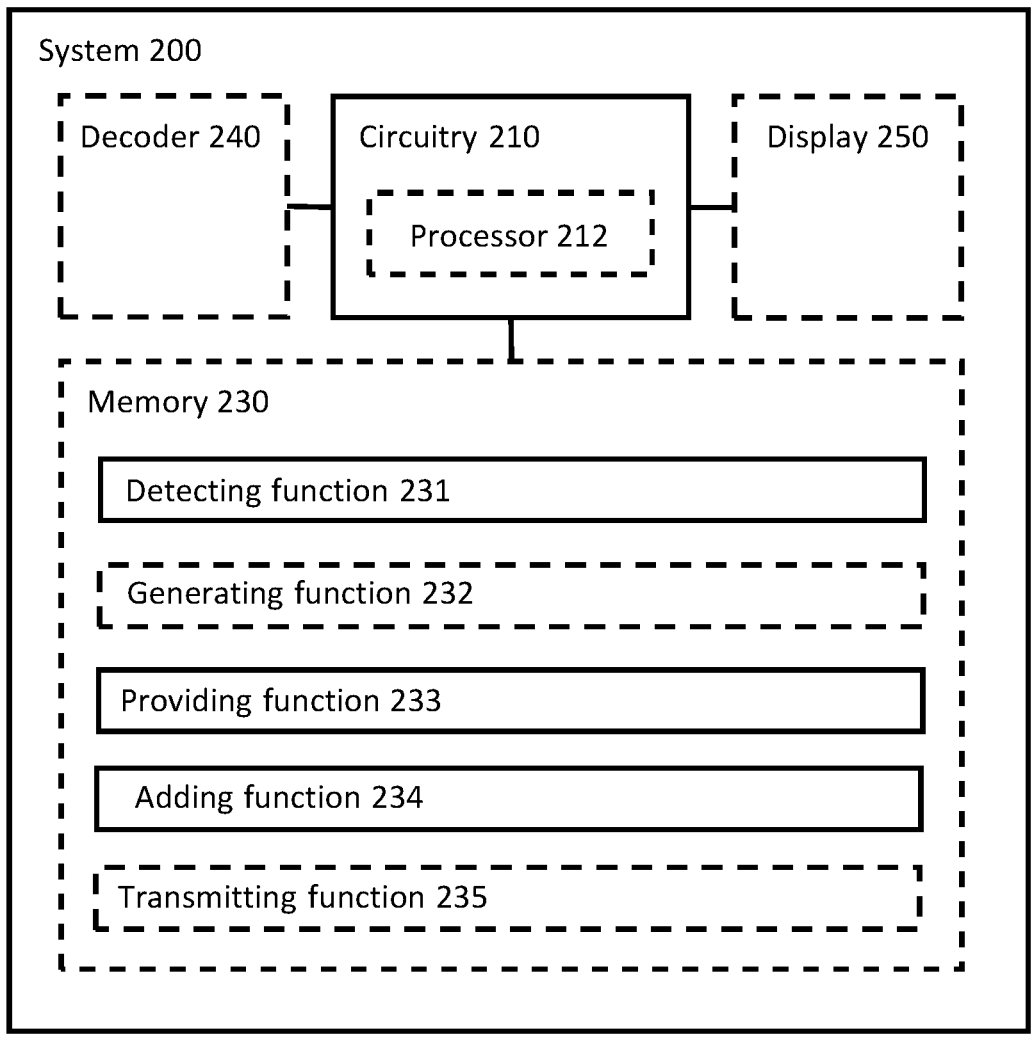
FIG. 2 shows a schematic diagram in relation to embodiments of a system of the present disclosure.

FIG. 2 shows a schematic diagram in relation to embodiments of a system 200 of the present disclosure for adding one additional image frame or a sequence of additional image frames to a stream of encoded image frames, wherein the stream of encoded image frames consists of image frames encoded by an encoder. The system 200 comprises circuitry 210. The circuitry 210 is configured to carry out functions of the system 200. The circuitry 210 may include a processor 212, such as a central processing unit (CPU), microcontroller, or microprocessor. The processor 212 is configured to execute program code. The program code may for example be configured to carry out the functions of the system 200.

The system 200 may further comprise a memory 230. The memory 230 may be one or more of a buffer, a flash memory, a hard drive, a removable media, a volatile memory, a non-volatile memory, a random access memory (RAM), or another suitable device. In a typical arrangement, the memory 230 may include a non-volatile memory for long term data storage and a volatile memory that functions as device memory for the circuitry 210. The memory 230 may exchange data with the circuitry 210 over a data bus. Accompanying control lines and an address bus between the memory 230 and the circuitry 210 also may be present.

Functions of the system 200 may be embodied in the form of executable logic routines (e.g., lines of code, software programs, etc.) that are stored on a non-transitory computer readable medium (e.g., the memory 230) of the system 200 and are executed by the circuitry 210 (e.g., using the processor 212). Furthermore, the functions of the system 200 may be a stand-alone software application or form a part of a software application that carries out additional tasks related to the system 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a detecting function 231, a providing function 233, and an adding function 234. The circuitry 210 may optionally be configured to further execute a generating function 232, and a transmitting function 235.

The detecting function 231 is configured to detect an event relating to at least one type out of a change of operation state of a sender 310 of the stream of encoded image frames, and a change of connection state between the sender 310 a receiver 320 of the stream of encoded image frames.

The providing function 233 is configured to, depending on the type of the event detected by the detecting function 231, provide the one additional image frame or the sequence of additional image frames, wherein the one additional image frame or each additional image frame of the sequence of additional image frames comprises a reference to a preceding image frame and codes a predetermined visual change relative to the preceding image frame, wherein the predetermined visual change is indicative of the type of the detected event detected by the detecting function 231.

The adding function 234 is configured to add the one additional image frame or the sequence of additional image frames to the stream of encoded image frames to obtain a combined stream of image frames.

The generating function 232 is configured to generate the one additional image frame or each one of the sequence of additional image frames based only on predetermined motion vectors and/or predetermined frequency domain coefficients.

The transmitting function 235 is configured to transmit the combined stream of image frames to a decoder.

It is to be noted that the system 200 and its included parts are typically not implemented at a single location. For example, the circuitry 210 and the memory 230 may be distributed between or duplicated in the sender 310 and the receiver 320. Typically, events of a type identified in the sender 310 will be handled by a portion of the circuitry 210 and functions 231-235 in the memory 230 located in the sender 310 or one of the duplicated circuitry 210 and functions 231-235 in the memory 230 located in the sender 310. Correspondingly, events of a type identified in the receiver 320 will typically be handled by a portion of the circuitry 210 and functions 231-235 in the memory 230 located in the receiver 320 or one of the duplicated circuitry 210 and functions 231-235 in the memory 230 located in the receiver 320.

The system 200 may further comprise a decoder 240. The decoder 240 is configured to decode the combined stream of image frames. The decoder 240 is located at the location of the receiver 320.

The system 200 may further comprise a display 250. The display 250 is configured to display the combined stream of image frames decoded by the decoder 240. Thereby the predetermined visual changes indicative of the detected event is displayed on the display 250. The display 250 is located at the location of the receiver 320.

The functions carried out by the circuitry 210 may be further adapted in the same way as the corresponding steps of the embodiments of the method described in relation to FIG. 1 and FIG. 3.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for adding at least one additional image frame or a sequence of additional image frames to a stream of encoded image frames, wherein the stream of encoded image frames consists of image frames encoded by an encoder, the method comprising:
   detecting an event relating to one type out of two types of events:
       a change of operation state of a sender of the stream of encoded image frames; and
       a change of connection state between the sender and a receiver of the stream of encoded image frames;
   depending on the type of the detected event, providing the one additional image frame or the sequence of additional image frames, wherein the one additional image frame or each additional image frame of the sequence of additional image frames comprises a reference to a preceding image frame and codes a predetermined visual change relative to the preceding image frame, wherein the predetermined visual change is indicative of the type of the detected event, wherein at least two different predetermined visual changes are selectable and each one of the two different predetermined visual changes is indicative of a respective one of the two types of events; and
   adding the one additional image frame or the sequence of additional image frames to the stream of encoded image frames to obtain a combined stream of image frames to be decoded by a decoder and displayed on a display thereby displaying the predetermined visual changes indicative of the detected event.

2. The method of claim 1, wherein the one additional image frame or the sequence of additional image frames each further comprises at least one of:
   one or more interblocks with motion vectors and/or quantized frequency domain coefficients, and
   one or more intrablocks with quantized frequency domain coefficients.

3. The method of claim 1, wherein the preceding image frame is one out of:
   an encoded image frame in the stream of encoded image frames;
   an added start image frame intracoding a start image; and
   an additional image frame in the sequence of additional image frames.

4. The method of claim 3, wherein the preceding image frame is a directly preceding image frame in the combined stream of image frames.

5. The method of claim 1, further comprising:
   transmitting the combined stream of image frames to a decoder located at a location of the receiver of the stream;
   decoding the combined stream of image frames; and
   displaying the decoded combined stream of image frames on a display located at the location of the receiver of the stream, thereby displaying the predetermined visual changes indicative of the detected event.

6. The method of claim 1, wherein the detected event relates to at least one type out of:
- a shutdown of the sender of the stream of encoded image frames,
- a connection failure between the sender and the receiver of the stream of encoded image frames,
- a failure of the sender of the stream of encoded image frames,
- a start-up of the sender of the stream of encoded image frames,
- a reconnection between the sender and the receiver of the stream of encoded image frames, and
- a reboot of the sender of the stream of encoded image frames.

7. The method claim 1, wherein the predetermined visual change is one out of: a movement, a change in colour, and a change in brightness.

8. A non-transitory computer-readable storage medium having stored thereon instructions for implementing the method, when executed in a device having at least one processor, the method for adding at least one additional image frame or a sequence of additional image frames to a stream of encoded image frames, wherein the stream of encoded image frames consists of image frames encoded by an encoder, the method comprising:
- detecting an event relating to one type out of two types of events:
  - a change of operation state of a sender of the stream of encoded image frames; and
  - a change of connection state between the sender and a receiver of the stream of encoded image frames;
- depending on the type of the detected event, providing the one additional image frame or the sequence of additional image frames, wherein the one additional image frame or each additional image frame of the sequence of additional image frames comprises a reference to a preceding image frame and codes a predetermined visual change relative to the preceding image frame, wherein the predetermined visual change is indicative of the type of the detected event, wherein at least two different predetermined visual changes are selectable and each one of the two different predetermined visual changes is indicative of a respective one of the two types of events; and
- adding the one additional image frame or the sequence of additional image frames to the stream of encoded image frames to obtain a combined stream of image frames to be decoded by a decoder and displayed on a display thereby displaying the predetermined visual changes indicative of the detected event.

9. A system for adding one additional image frame or a sequence of additional image frames to a stream of encoded image frames, wherein the stream of encoded image frames consists of image frames encoded by an encoder, the system comprising circuitry configured to execute:
- a detecting function configured to detect an event relating to one type out of two types of events:
  - a change of operation state of a sender of the stream of encoded image frames; and
  - a change of connection state between the sender and a receiver of the stream of encoded image frames;
- a providing function configured to, depending on the type of the event detected by the detecting function, provide the one additional image frame or the sequence of additional image frames, wherein the one additional image frame or each additional image frame of the sequence of additional image frames comprises a reference to a preceding image frame and codes a predetermined visual change relative to the preceding image frame, wherein the predetermined visual change is indicative of the type of the detected event, wherein at least two different predetermined visual changes are selectable and each one of the two different predetermined visual changes is indicative of a respective one of the two types of events; and
- an adding function configured to add the one additional image frame or the sequence of additional image frames to the stream of encoded image frames to obtain a combined stream of image frames to be decoded by a decoder and displayed on a display thereby displaying the predetermined visual changes indicative of the detected event.

10. The system of claim 9, where the circuitry is further configured to execute:
- a transmitting function configured to transmit the combined stream of image frames to a decoder located at a location of the receiver of the stream,
- wherein the system further comprises:
- the decoder configured to decode the combined stream of image frames; and
- a display located at a location of the receiver of the stream configured to display the decoded combined stream of image frames on a display thereby displaying the predetermined visual changes indicative of the detected event.

11. The system of claim 9, wherein the circuitry is further configured to execute:
- a generating function configured to generate the one additional image frame or each one of the sequence of additional image frames based only on predetermined motion vectors and/or predetermined frequency domain coefficients.

* * * * *